United States Patent
Werner et al.

(10) Patent No.: US 10,896,039 B2
(45) Date of Patent: Jan. 19, 2021

(54) PROGRAMMABLE MATRIX PROCESSING ENGINE

(71) Applicant: Intel Corporation, Santa Clara, CA (US)

(72) Inventors: Tony L. Werner, Los Altos, CA (US); Aravind Kalaiah, San Jose, CA (US); Vijay Korthikanti, Milpitas, CA (US); Horace Lau, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/264,483

(22) Filed: Jan. 31, 2019

(65) Prior Publication Data
US 2019/0171450 A1    Jun. 6, 2019

Related U.S. Application Data

(63) Continuation of application No. 15/395,654, filed on Dec. 30, 2016, now Pat. No. 10,228,937.

(51) Int. Cl.
*G06F 9/30* (2018.01)
*G06N 3/063* (2006.01)
*G06N 3/08* (2006.01)

(52) U.S. Cl.
CPC ........ *G06F 9/3001* (2013.01); *G06F 9/30043* (2013.01); *G06N 3/063* (2013.01); *G06N 3/084* (2013.01)

(58) Field of Classification Search
None
See application file for complete search history.

(56) References Cited

U.S. PATENT DOCUMENTS

| 5,014,235 A  | * | 5/1991 | Morton | G06F 5/015 708/520 |
| 5,530,661 A  | * | 6/1996 | Garbe | G06F 1/03 708/319 |
| 5,721,945 A  | * | 2/1998 | Mills | G06F 9/30145 712/35 |
| 5,864,689 A  | * | 1/1999 | Tran | G06F 9/30145 712/208 |
| 6,195,674 B1 | * | 2/2001 | Elbourne | G06F 9/3879 708/401 |
| 8,392,487 B1 | * | 3/2013 | Mesh | G06F 17/16 708/191 |
| 9,600,281 B2 | * | 3/2017 | Eichenberger | G06F 9/30032 |

(Continued)

OTHER PUBLICATIONS

Extended European Search Report for EP Application No. 17208110.1, dated Jun. 5, 2018, 6 pages.

*Primary Examiner* — Eric Coleman
(74) *Attorney, Agent, or Firm* — Alliance IP, LLC

(57) ABSTRACT

In one embodiment, a matrix operation may be performed on one or more matrix operands. For example, matrix data may be received from a multi-dimensional memory, wherein the matrix data is associated with the one or more matrix operands. The one or more matrix operands may be extracted from the matrix data. A matrix routine associated with the matrix operation may be identified. The matrix routine may be executed on a matrix processor using the one or more matrix operands. A result of the matrix operation may be obtained based on the matrix routine executed by the matrix processor.

25 Claims, 7 Drawing Sheets

(56) References Cited

U.S. PATENT DOCUMENTS

| | | | |
|---|---|---|---|
| 2001/0051860 A1* | 12/2001 | Copeland | G06T 5/20 |
| | | | 703/2 |
| 2004/0111587 A1* | 6/2004 | Nair | G06F 9/30014 |
| | | | 712/34 |
| 2005/0071407 A1 | 3/2005 | Gustavson et al. | |
| 2005/0071410 A1* | 3/2005 | Gustavson | G06F 17/16 |
| | | | 708/514 |
| 2005/0144210 A1* | 6/2005 | Simkins | H03K 19/17736 |
| | | | 708/490 |
| 2006/0161612 A1 | 7/2006 | Gustavson et al. | |
| 2006/0179267 A1 | 8/2006 | Chatterjee et al. | |
| 2006/0265445 A1 | 11/2006 | Gustavson et al. | |
| 2007/0079107 A1* | 4/2007 | Van Den Berg | G06F 15/8023 |
| | | | 712/11 |
| 2007/0211064 A1 | 9/2007 | Buck et al. | |
| 2014/0108481 A1* | 4/2014 | Davis | G06F 17/16 |
| | | | 708/607 |
| 2015/0326245 A1* | 11/2015 | Li | H03M 7/30 |
| | | | 707/693 |
| 2016/0188337 A1 | 6/2016 | Lee et al. | |
| 2016/0239706 A1 | 8/2016 | Dijkman et al. | |
| 2016/0253775 A1 | 9/2016 | Kalele et al. | |
| 2016/0275909 A1* | 9/2016 | Subramanian | G06F 9/46 |
| 2018/0188972 A1 | 7/2018 | Yang et al. | |
| 2018/0189227 A1 | 7/2018 | Korthikanti et al. | |
| 2018/0189236 A1 | 7/2018 | Korthikanti et al. | |
| 2018/0189237 A1 | 7/2018 | Werner et al. | |
| 2018/0189238 A1 | 7/2018 | Lau et al. | |
| 2018/0189652 A1 | 7/2018 | Korthikanti et al. | |

* cited by examiner

PROGRAMMABLE MATRIX PROCESSING ENGINE

CROSS-REFERENCE TO RELATED APPLICATIONS

This Application is a continuation (and claims the benefit of priority under 35 U.S.C. § 120) of U.S. application Ser. No. 15/395,654, filed Dec. 30, 2016 and entitled PROGRAMMABLE MATRIX PROCESSING ENGINE. The disclosure of the prior application is considered part of and is incorporated by reference in the disclosure of this Application.

FIELD OF THE SPECIFICATION

This disclosure relates in general to the field of computer processing, and more particularly, though not exclusively, to programmable matrix processing.

BACKGROUND

Matrix operations, such as matrix multiplication and convolutions, can be highly processor-intensive and memory-intensive operations, as they often involve complex operations on large, multi-dimensional matrix operands. Accordingly, the performance of complex matrix operations can be limited by the processing and/or memory latency. As matrix operations are increasingly utilized in a variety of applications and with ever-growing data sets (from graphics and image processing to machine learning and artificial intelligence), the demand for high-performance and flexible processing of matrix operations is increasing.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
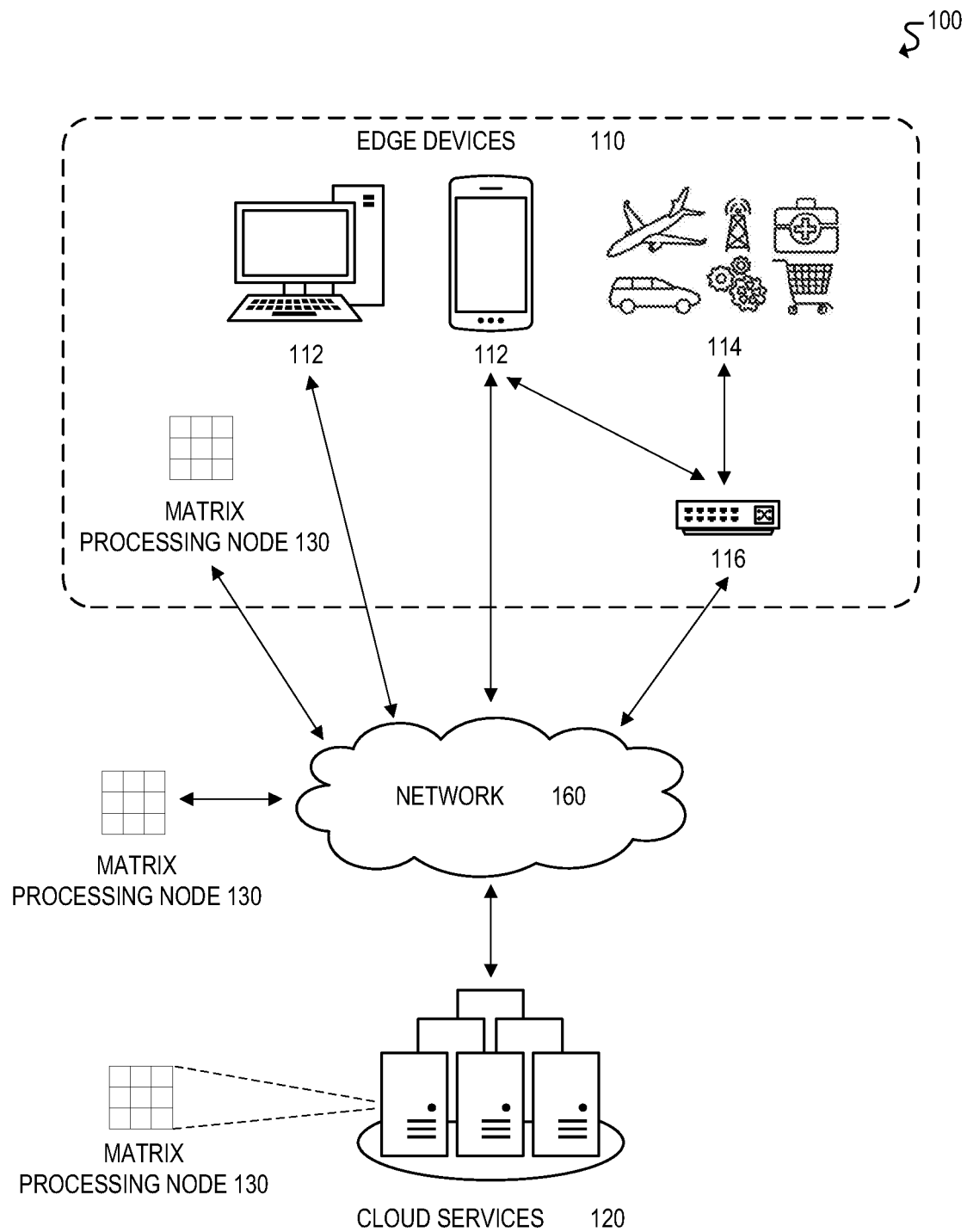
FIG. 1 illustrates a schematic diagram for an example computing system according to certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Matrix processing operations (e.g., linear algebra operations that involve matrix and/or vector operands) have a wide range of applications in computing systems, from graphics processing to machine learning and artificial intelligence, among other examples. For example, complex matrix operations may be used to implement artificial neural networks that provide artificial intelligence and machine learning capabilities, including computer vision, autonomous navigation, speech and audio recognition, and natural language processing, among other examples. These complex matrix operations (e.g., matrix multiplication and convolutions) may be used to implement the fundamental operations of neural networks, such as forward propagation, backward propagation, and weight updates. These matrix operations, however, can be highly processor and memory intensive, as they often involve complex operations on large, multi-dimensional matrix operands. Accordingly, the performance of these matrix operations can be limited by processing and/or memory latency. Moreover, these rigid matrix operations are often implemented without any flexibility to implement new types or variations of matrix operations and/or modify the behavior of existing operations. As matrix operations are increasingly utilized in a variety of applications with ever-growing data sets, such as artificial intelligence and machine learning, the demand for both high-performance processing and flexible implementations of matrix operations is increasing.

Existing matrix processing approaches suffer from various inefficiencies, particularly when used to implement artificial intelligence and machine learning in artificial neural networks. For example, while central processing units (CPUs) could be used to perform matrix operations, many CPU architectures are designed for low arithmetic intensity operations (i.e., a low ratio of arithmetic operations relative to memory operations), and thus are not designed for efficient execution of matrix operations. Moreover, many CPU architectures utilize complex local or cache memory management routines, which may increase processing overhead and execution complexity for operations involving large matrix operands. Graphics processing units (GPUs) could also be used to perform matrix operations. GPUs, however, are often designed for high precision computations and may provide a level of precision that is unnecessary for certain matrix operations, thus reducing the volume of matrix operations that can be performed. Accordingly, existing matrix processing approaches are inefficient for certain matrix operations, such as matrix multiplication or convolution operations involving large matrix operands and/or matrix operands with certain dimensions, among other examples. Moreover, existing approaches cannot be efficiently scaled to perform these matrix operations across additional processing resources in parallel. Thus, existing approaches do not achieve 100% processing efficiency when scaling and/or distributing these matrix operations. Moreover, existing approaches are often rigid and inflexible with limited or no ability to define new matrix operations, modify existing matrix operations, and so forth.

The matrix processing functionality described throughout this disclosure provides a flexible or "programmable" approach for defining or implementing particular matrix operations. For example, certain embodiments may include a matrix processor that can execute programmable matrix routines. A matrix routine, for example, may be a programmable routine that is designed to perform a particular matrix operation when executed by a matrix processor. For example, a matrix routine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental operations. In this manner, matrix routines for more complex matrix operations can be programmed using the fundamental instructions and/or commands supported by the matrix processor. In some embodiments, these matrix routines can be stored on a matrix routine memory associated with a matrix processor. Then, when a particular matrix operation needs to be performed, the matrix processor can retrieve the corresponding matrix routine from the matrix routine memory, and then execute the instructions and/or commands of the routine to perform the desired matrix operation.

The programmable matrix processing functionality described throughout this disclosure provides numerous technical advantages, including alleviating the inefficiencies of existing approaches, and enabling flexible matrix operations to be efficiently defined and implemented using programmable matrix routines. These programmable matrix routines enable wide varieties of matrix processing functionality to be implemented on matrix processors programmatically rather than via inefficient, time-consuming, and costly hardware-based implementations.

Example embodiments that may be used to implement the matrix processing functionality of this disclosure will now be described with more particular reference to the attached FIGURES.

FIG. 1 illustrates a schematic diagram for an example computing system 100 according to certain embodiments.

In some embodiments, the matrix processing functionality described throughout this disclosure may be implemented in system 100. Matrix processing functionality may be used in system 100 for a wide range of applications and/or use cases involving matrix operations, from graphics processing to machine learning and artificial intelligence, among other examples. For example, in some embodiments, matrix processing functionality may be used to implement artificial intelligence and machine learning in artificial neural networks. Moreover, matrix processing functionality may be implemented by any component of system 100. For example, in the illustrated embodiment, system 100 includes edge devices 110, cloud services 120, matrix processing nodes 130, and network 150. Matrix processing nodes 130 may include any component or device with matrix processing functionality, including any component of system 100. For example, matrix processing nodes 130 may include cloud services 120 and/or servers implemented with matrix processing functionality (e.g., application servers in a datacenter), edge devices 110 implemented with matrix processing functionality (e.g., end-user devices 112, Internet-of-Things devices 114, gateways 116), and so forth. These various components of system 100 are discussed further below.

Edge devices 110 may include any equipment and/or devices deployed or connected near the "edge" of a communication system 100. Edge devices 110 may communicate with each other and/or with other remote networks and services (e.g., cloud services 120) through one or more networks and/or communication protocols, such as network 150. In some embodiments, certain edge devices 110 may include the matrix processing functionality described throughout this disclosure, and thus may be used as matrix processing nodes 130. In the illustrated embodiment, edge devices 110 include end-user devices 112 (e.g., desktops, laptops, mobile devices), Internet-of-Things (IoT) devices 114, and gateways and/or routers 116, among other examples.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data storage, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. In some embodiments, certain cloud services 120 may include the matrix processing functionality described throughout this disclosure, and thus may be used as matrix processing nodes 130.

In general, edge devices 110 (and in particular IoT devices 114) may generate an extremely large volume and variety of data. IoT edge devices 114 typically offload this data to the cloud for processing and/or storage (e.g., by cloud services 120). Cloud services 120, however, may not necessarily be suited to handle the rapidly growing volume, variety, and velocity of data generated by IoT devices 114 and other edge devices 110. For example, cloud-based processing may not be ideal in certain circumstances, such as processing time-sensitive or highly confidential data, or when faced with network bandwidth constraints, among other examples. In some embodiments, cloud services 120 may leverage "edge" based processing using edge devices 110 to improve the performance of cloud services. Edge processing is an approach that involves processing certain data at the network edge (e.g., using edge devices 110), near where the data is generated, rather than simply funneling large volumes of data to the cloud for processing and storage. Certain data may still be sent to the cloud, as appropriate, such as for deeper analysis and/or long-term storage. Edge processing may be used to complement the shortcomings of cloud-based processing (e.g., when cloud-based processing is inefficient, ineffective, and/or unsecure), and thus improve the handling of the growing volume, variety, and velocity of data generated by IoT devices 114 and/or other edge devices 110. For example, in some cases, processing data near its source (e.g., in the network edge) rather than in the cloud may improve performance and/or avoid system failures or disasters. Edge processing may also conserve network bandwidth, which may be particularly beneficial when facing bandwidth constraints and/or limited network connectivity.

In some embodiments, edge devices 110 that provide edge-based processing for cloud services 120 may be collectively referred to as the "fog," as they serve to extend the "cloud" to the edge of the network, thus creating a "fog" over the network edge. In some embodiments, devices 110 in the "fog" may connect and/or communicate with each other, for example, using an interconnection standard or protocol. For example, in some embodiments, device interconnection may be implemented using the open interconnect consortium (OIC) standard specification 1.0, released by the Open Connectivity Foundation™ (OCF) on Dec. 23, 2015, which enables devices to discover and connect with each other. Another interconnection protocol that may be used is Thread, a networking protocol for Internet-of-Things (IoT) devices used in "smart" home automation and similar deployments, which has been developed by an alliance of organizations named the "Thread Group." Other interconnection protocols may also be used, including, for example, the optimized link state routing (OLSR) protocol, or the better approach to mobile ad-hoc networking (B.A.T.M.A.N.), among others.

Network 150 may be used to facilitate communication between the components of computing system 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Example Matrix Processing Architecture

Figure 2A:
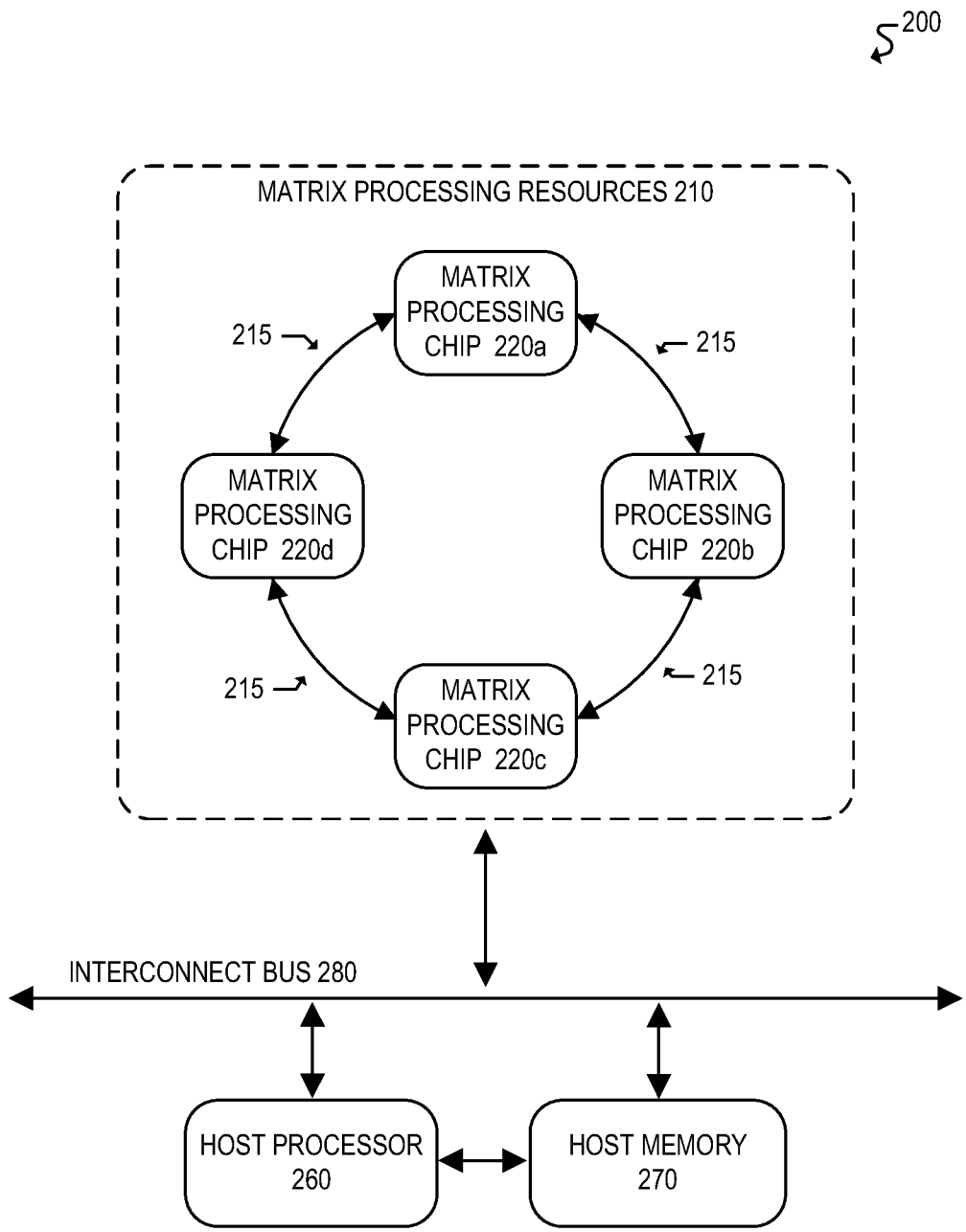
FIGS. 2A-C illustrate block diagrams for an example embodiment of a matrix processing architecture.
Figure 2B:
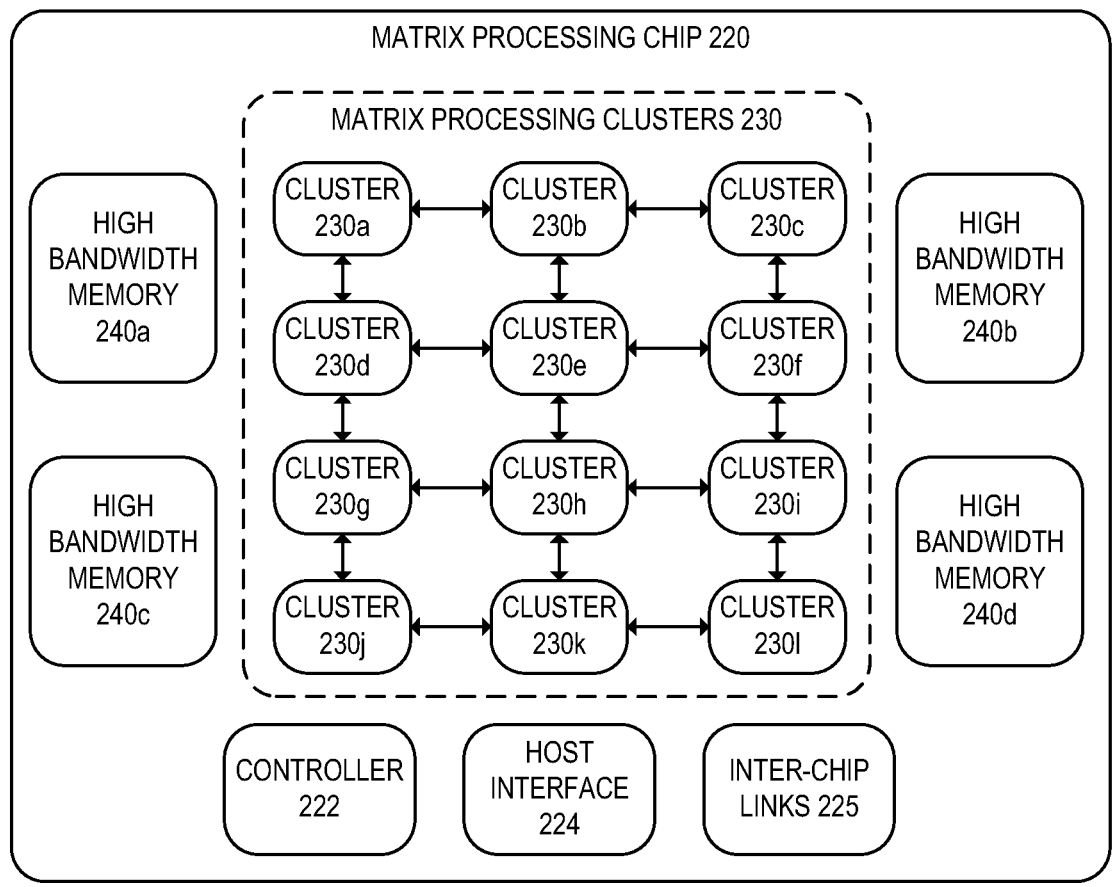
Figure 2C:
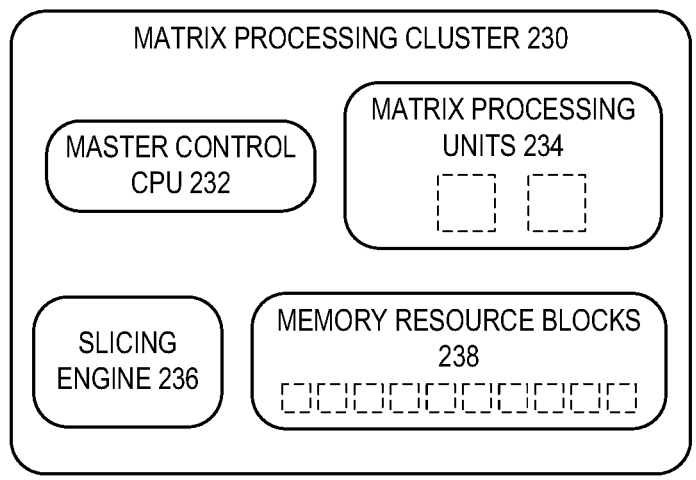

FIGS. 2A-C illustrate block diagrams for an example embodiment of a matrix processing architecture.

In some embodiments, the matrix processing functionality described throughout this disclosure may be implemented using a matrix processing architecture, such as the matrix processing architecture of FIGS. 2A-2C. Matrix processing architectures, such as the matrix processing architecture of FIGS. 2A-2C, may be implemented or used in a variety of systems, devices, and/or components, such as those described throughout this disclosure, including system 100 of FIG. 1 and/or any of its associated components (e.g., cloud services 120/datacenter servers, edge devices 110, matrix processing nodes 130). In some embodiments, the matrix processing architecture of FIGS. 2A-2C may be used to implement artificial intelligence and machine learning in neural networks. The matrix processing architecture illustrated in FIGS. 2A-2C is merely one example embodiment for performing the matrix processing functionality described throughout this disclosure. Other embodiments may use different types, arrangements, and/or numbers of components. For example, other embodiments may include any number of matrix processing chips 220, matrix processing clusters 230, matrix processing units (MPUs) 234, high bandwidth memory (HBM) modules 240, and/or memory resource blocks (MRBs) 238. Moreover, all or part of any component of the matrix processing architecture of FIGS. 2A-2C (e.g., any component of matrix processing system 200, matrix processing chips 220, and/or matrix processing clusters 230) may be implemented as a separate or stand-alone component or chip, or may be integrated with other components or chips, such as a system-on-a-chip (SoC) that integrates various computer components into a single chip.

FIG. 2A illustrates a block diagram for an example embodiment of a matrix processing system 200. In the illustrated embodiment, matrix processing system 200 includes host processor 260, host memory 270, matrix processing resources 210, and interconnect bus 280.

Host processor 260 may be configured to control and/or manage matrix processing system 200. For example, in some embodiments, host processor 260 may use matrix processing resources 210 to perform complex matrix operations. Host processor 260 may be any processing resource capable of controlling and/or managing matrix processing functionality of matrix processing system 200. For example, in some embodiments, host processor 260 may be implemented using computer processors 300 or 400 of FIGS. 3 and 4, respectively. In some embodiments, host processor 260 may be a separate or stand-alone component that is communicatively coupled to matrix processing resources 210. Alternatively, in other embodiments, host processor 260 and matrix processing resources 210 may be integrated into the same component or chip. For example, in some embodiments, the components of matrix processing system 200, including host processor 260 and matrix processing resources 210, may be implemented as a system-on-a-chip (SoC).

Host memory 270 may include any type or combination of volatile and/or non-volatile memory. Examples of volatile memory include various types of random access memory (RAM), such as dynamic random access memory (DRAM), synchronous dynamic random access memory (SDRAM), and static random access memory (SRAM), among other examples. Examples of non-volatile memory include disk-based storage mediums (e.g., magnetic and/or optical storage mediums), solid-state storage (e.g., any form of persistent flash memory, including planar or three dimensional (3D) NAND flash memory or NOR flash memory), 3D crosspoint memory, electrically erasable programmable read-only memory (EEPROM), and/or other types of non-volatile random access memories (RAM), among other examples. Host memory 270 may be used, for example, to store information for host processor 260 during execution, such as code and/or data.

Interconnect bus 280 may be used, in some embodiments, to communicatively couple host processor 260 and host memory 270 to matrix processing resources 210. Interconnect bus 280 may use any interconnection protocol, such as Peripheral Component Interconnect express (PCIe), Universal Serial Bus (USB), or Small Computer Systems Interface (SCSI), among other examples.

Matrix processing resources 210 may include any processing resources configured to perform matrix operations. For example, matrix processing resources 210 may be configured to perform matrix multiplication operations, convolution operations, element-wise matrix operations (e.g., +, *, / <, >, ==), dimension shuffle operations, and/or any combination thereof. In some embodiments, matrix processing resources 210 may include processing resources that are designed and optimized for performing matrix operations. In some embodiments, matrix processing resources 210 may also be arranged hierarchically with multiple levels of processing resources. For example, in the illustrated embodiment, matrix processing resources 210 include a plurality of matrix processing chips 220, and may also include any processing resources within each matrix processing chip 220. For example, as discussed below in connection with FIGS. 2B and 2C, each matrix processing chip 220 may include a plurality of high bandwidth memory (HBM) modules 240 and a plurality of matrix processing clusters 230, and each matrix processing cluster 230 may include multiple matrix processing units 234. Thus, in some embodiments, matrix processing resources 210 may include multiple matrix processing chips 220, multiple high bandwidth memory (HBM) modules 240 and multiple matrix processing clusters 230 on each matrix processing chip 220, and/or multiple matrix processing units 234 on each matrix processing cluster 230.

Matrix processing chips 220 may be, for example, any chips or other components configured to perform matrix operations. For example, in some embodiments, a matrix processing chip 220 may be a peripheral card or chip connected to host processor 260 using any type of interconnect interface, such as a PCIe interface. In some embodiments, a matrix processing chip 220 may be implemented using an integrated circuit, such as an application specific integrated circuit (ASIC), a field programmable gate array (FPGA), and/or any other type of circuitry. In the illustrated embodiment, matrix processing chips 220 are configured in a cyclical arrangement, with communication channels 215 between neighboring matrix processing chips 220. In some embodiments, communication channels 215 may provide one-way communication between neighboring matrix processing chips 220. In other embodiments, however, communication channels 215 may provide bi-directional communication between neighboring matrix processing chips 220. A cyclical arrangement with one-way communication between neighboring processing resources may be referred to as a "single-cyclical" configuration, while a cyclical arrangement with bi-directional communication between neighboring processing resources may be referred to as a "dual-cyclical" configuration.

Moreover, although not illustrated, in some embodiments matrix processing system 200 may include a communication interface to communicate over a communication network. For example, in some embodiments, matrix processing system 200 may communicate over a network with one or more remote matrix processing chips to perform distributed matrix operations.

FIG. 2B illustrates a block diagram for an example embodiment of a matrix processing chip 220. In the illustrated embodiment, matrix processing chip 220 includes controller 222, host interface 224, inter-chip links 225, high bandwidth memory (HBM) modules 240, and matrix processing clusters 230.

Controller 222 may be configured to control and/or manage matrix operations performed by matrix processing chip 220. In some embodiments, controller 222 may control and/or manage matrix operations in conjunction with host processor 260 of FIG. 2A and/or master control CPUs (MCCs) 232 of matrix processing clusters 230 of FIG. 2C. For example, in some embodiments, host processor 260, controller 222, and/or master control CPUs (MCCs) 232 may be configured to receive a matrix operation or command, and distribute the matrix operation and matrix operands across matrix processing clusters 230 and high bandwidth memory (HBM) modules 240. In some embodiments, controller 222 may be a microprocessor, an integrated circuit, and/or any other type of circuitry and/or processing logic.

Host interface 224 may be a communication interface that enables a matrix processing chip 220 to communicate with host processor 260 of FIG. 2A. In some embodiments, for example, controller 222 may use host interface 224 to communicate with host processor 260 of FIG. 2A. Host interface 224 may use any type of interconnect protocol or interface, including Peripheral Component Interconnect express (PCIe), Universal Serial Bus (USB), or Small Computer Systems Interface (SCSI), among other examples.

Inter-chip links (ICLs) 225 may enable a matrix processing chip 220 to communicate with other matrix processing chips. For example, inter-chip links 225 may be used to implement the communication channels 215 between matrix processing chips 220 in FIG. 2A. An inter-chip link 225 may be, for example, any communication interface that enables a matrix processing chip 220 to communicate with another matrix processing chip. In some embodiments, a matrix processing chip 220 may include multiple inter-chip links 225 (e.g., twelve inter-chip links). In some embodiments, an inter-chip link 225 may be implemented using one or more serializer/de-serializer (SerDes) interfaces. A SerDes interface may be a communication interface that converts data from serial to parallel, and vice-versa. For example, the transmitter of a SerDes interface may include a serial-to-parallel converter, and the receiver of a SerDes interface may include a parallel-to-serial converter. In some embodiments, a matrix processing chip 220 may use multiple SerDes interfaces for each connection to another matrix processing chip (e.g., four SerDes interfaces between each pair of connected matrix processing chips).

High bandwidth memory (HBM) modules 240 may be memory components associated with matrix processing chip 220 that are used to store matrix operands and other matrix data. In some embodiments, high bandwidth memory (HBM) modules 240 may be designed to efficiently store and retrieve matrix data. In some embodiments, high bandwidth memory (HBM) modules 240 may be multi-dimensional memory components configured to store and retrieve data in multiple dimensions. For example, in some embodiments, high bandwidth memory (HBM) modules 240 may be memory components configured to store and retrieve data in two dimensions, such as rows and columns. Other embodiments, however, may use memory components configured to store and retrieve data using any other number of dimensions (e.g., one dimension, three dimensions, four dimensions, and so forth). In the illustrated embodiment, matrix processing chip 220 includes four high bandwidth memory (HBM) modules 240a-d. In some embodiments, high bandwidth memory (HBM) modules 240 may be shared by the matrix processing clusters 230 of a matrix processing chip 220.

Matrix processing clusters 230 may include processing resources configured to perform matrix operations, such as matrix multiplication, convolutions, and/or dimension shuffling, among other examples. In some embodiments, matrix processing clusters 230 may be collectively used to execute a particular matrix operation by performing matrix processing in parallel. In the illustrated embodiment, matrix processing chip 220 includes twelve matrix processing clusters 230a-l. Moreover, in the illustrated embodiment, matrix processing clusters 230 are configured or arranged using a two-dimensional mesh interconnection topology. The interconnection topology of matrix processing clusters 230 may facilitate cyclical communication among the matrix processing clusters 230. Moreover, other embodiments may include any number and/or arrangement of matrix processing clusters 230.

FIG. 2C illustrates a block diagram for an example embodiment of a matrix processing cluster 230. In the illustrated embodiment, matrix processing cluster 230 includes master control CPU (MCC) 232, matrix processing units (MPUs) 234, slicing engine 236, and memory resource blocks (MRBs) 238.

Master control CPU (MCC) 232 may be configured to control and/or manage matrix operations performed by a matrix processing cluster 230. In some embodiments, master control CPU 232 may be a microprocessor, an integrated circuit, and/or any other type of circuitry and/or processing logic. In some embodiments, master control CPU 232 may receive instructions from another component, such as host processor 260 of FIG. 2A and/or controller 222 of FIG. 2B. Based on the instructions, master control CPU 232 may then use matrix processing units 234 to perform matrix operations, such as matrix multiplication, convolutions, and/or dimension shuffling, among other examples. For example, master control CPU 232 may receive an instruction to perform a matrix multiplication operation, such as C=A*B. The instruction may include the handles or identifiers for each matrix, and may also indicate how the matrices should be stored in memory resource blocks (MRBs) 238. Matrices A and B may then be broken down into a series of smaller matrices (e.g., 32×32 matrices). Matrix operations may then be performed on the smaller matrices, and the partial results may be stored in memory resource blocks (MRBs) 238, until the output matrix C has been fully computed.

Matrix processing units (MPUs) 234 may be configured to perform matrix operations, such as matrix multiplication, convolutions, and/or dimension shuffling. In some embodiments, matrix processing units (MPUs) 234 perform matrix operations based on commands received from master control CPU (MCC) 232. Moreover, in some embodiments, each matrix processing cluster 230 may include multiple matrix processing units (MPUs) 234. For example, in the illustrated embodiment, matrix processing cluster 230 includes two matrix processing units (MPUs) 234. A matrix processing unit (MPU) 234 may be capable of performing matrix operations, such as matrix multiplication, on small matrices (e.g., 32×32 matrices). In some cases, a matrix processing unit (MPU) 234 may be designed and/or optimized to perform matrix multiplication operations. A matrix processing unit (MPU) 234 may load matrix operands from memory resource blocks (MRBs) 238. In some embodiments, a matrix processing unit (MPU) 234 may support the following arithmetic operations: matrix multiplication; unary matrix operations; binary matrix operations, such as addition (+), subtraction (−), multiplication (*), division (/), bitwise XOR, AND, OR, logical and arithmetic left and right shift, comparison (>, <, >=, <=, ==, !=); and column-wise, row-wise, and matrix-wide operations, such as sum, max value, and min value.

Slicing engine 236 may be configured to slice the matrix operands of a particular matrix operation into smaller partial matrices. For example, in some embodiments, master control CPU (MCC) 232 may use slicing engine 236 to break up matrix operands into smaller partial matrices for matrix processing units (MPUs) 234. In some embodiments, slicing engine 236 may include a convolution slicing engine (CSE) to perform matrix slicing for convolution operations. For example, in some embodiments, a convolution slicing engine (CSE) may slice matrix operands in a manner that enables a convolution operation to be cast as a matrix multiplication operation, thus enabling the same processing logic to perform both matrix multiplication and convolution operations. Moreover, in some embodiments, slicing engine 236 and/or the associated convolution slicing engine (CSE) may be used to perform the dimension shuffle operations to reorder the dimensions of a matrix.

Memory resource blocks (MRBs) 238 may be memory components on matrix processing cluster 230 used to store matrix operands and other matrix data. In some embodiments, memory resource blocks (MRBs) 238 may be designed to store and retrieve matrix data efficiently. In some embodiments, memory resource blocks (MRBs) 238 may be multi-dimensional memory components configured to store and retrieve data in multiple dimensions. For example, in some embodiments, memory resource blocks (MRBs) 238 may be memory components configured to store and retrieve data in two dimensions, such as rows and columns. In the illustrated embodiment, matrix processing cluster 230 includes ten memory resource blocks (MRBs) 238. Other embodiments, however, may include a different number of memory resource blocks (MRBs) 238 on a matrix processing cluster 230. In some embodiments, each memory resource block (MRB) 238 may be capable of storing a matrix of a certain size (e.g., a 256×512 matrix). In some embodiments, memory resource blocks (MRBs) 238 may be shared by the matrix processing units (MPUs) 234 of a particular matrix processing cluster 230.

In some embodiments, the matrix processing architecture of FIGS. 2A-2C may be used to implement the matrix processing functionality described throughout this disclosure. For example, matrix processing system 200 may be used to perform matrix operations using a distributed approach that achieves 100% processing efficiency using the available processing resources. For example, in some embodiments, a matrix operation may be distributed across multiple processing resources 210 that are optimized for matrix processing, thus enabling full utilization of the processing resources 210 throughout the duration of the matrix operation. For example, matrix processing system 200 may include multiple processing resources 210 that are designed and optimized for performing matrix operations. In some embodiments, these processing resources 210 may be configured in a single-cyclical or dual-cyclical arrangement. In addition, the processing resources 210 may be arranged hierarchically with multiple levels of processing resources. For example, in some embodiments, the processing resources 210 may include multiple matrix processing chips 220, multiple high bandwidth memory (HBM) modules 240 and multiple matrix processing clusters 230 on each matrix processing chip 220, and/or multiple matrix processing units (MPUs) 234 on each matrix processing cluster 230. This processing architecture enables matrix operations to be distributed across multiple processing resources 210 and/or processing hierarchies with 100% processing efficiency. In addition, this processing architecture enables matrix operations to be efficiently scaled across a variable number of processing resources 210 operating in parallel, while still achieving 100% processing efficiency. For example, scaling may be achieved by adjusting the number of processing resources 210 used to perform a particular matrix operation, such as the number of matrix processing systems 200 or servers, the number of matrix processing chips 220 in each matrix processing system 200 or server, and so forth.

As an example, the matrix processing architecture of FIGS. 2A-2C may be used to implement matrix multiplication and/or convolution operations. For example, in some embodiments, a matrix multiplication operation may be distributed across multiple processing resources 210 in a manner that results in the latency for communicating matrix operands being less than the matrix processing time, which allows the communication of matrix operands to be completed while the matrix processing is being performed. For example, for certain matrix operations involving matrix operands with certain dimensions (e.g., matrix multiplication with a "thin" matrix operand), the time required to access and communicate matrix operands may exceed the time required to perform the actual matrix computations, resulting in idle processing time while the matrix operands are being obtained from memory and/or communicated to processing resources 210. For example, a single-cyclical configuration (e.g., where each processing resource 210 only obtains matrix operands and data from one neighboring processing resource 210 at any given time) may be unable to achieve 100% processing efficiency for these particular types of matrix operations and matrix operands. However, a dual-cyclical configuration of processing resources 210 enables each processing resource to perform matrix computations while simultaneously obtaining matrix operands and data from both of its neighboring processing resources 210, which significantly reduces the latency for communicating matrix operands, and thus avoids any idle processing time. For example, the communication latency for certain operations may be reduced by half when using a dual-cyclical approach as opposed to a single-cyclical approach. In this manner, the latency for communicating matrix operands and matrix data can be fully masked by the matrix processing time, thus avoiding any wasted or idle processing time and achieving 100% processing efficiency. Accordingly, matrix operations (e.g., matrix multiplication or GEMM) can be performed efficiently even for large matrix operands and/or matrix operands with certain dimensions, such as a large matrix operand that is neither square nor a single vector (e.g., a "thin" matrix with a much larger height than width). For example, matrix multiplication can be performed efficiently even when multiplying two thin matrices, a thin matrix and a square matrix, and so forth. Similarly, convolution operations may be distributed across multiple processing resources 210 in a manner that results in 100% processing efficiency using the available processing resources.

As an example, when a matrix operation or command is received, the matrix operation may be distributed across the processing resources 210 of matrix processing system 200. For example, the matrix operands (or input matrices) may be partitioned based on the number of available processing resources 210. Moreover, in some embodiments, the partitions may be across the rows of the matrix operands, and/or across any other dimension of the matrix operands. Each partition may then be distributed to a particular processing resource 210. Each processing resource 210 may then perform a plurality of partial matrix operations. In some embodiments, the plurality of partial matrix operations is performed in a plurality of stages. For example, each processing resource 210 may perform a particular stage of partial matrix operations while simultaneously sending and receiving partial matrix data to and from its neighboring processing resources 210. For example, in a single-cyclical configuration of processing resources 210, each processing resource 210 either sends or receives partial matrix data to or from each neighbor processing resource. Similarly, in a dual-cyclical configuration of processing resources 210, each processing resource 210 may send and receive partial matrix data to and from each neighboring processing resource 210.

Each processing resource 210 may then use the partial matrix data for subsequent partial matrix operations. The result of the matrix operation may then be determined based on the partial matrix operations collectively performed by the processing resources 210.

Moreover, if the processing resources 210 are arranged hierarchically, the matrix operation may be distributed in a hierarchical manner. For example, the matrix operands (or input matrices) may initially be partitioned based on the number of available matrix processing chips 220. Each partition, and the associated partial matrix operations, may then be distributed to a particular matrix processing chip 220. The partition and partial matrix operations distributed to a particular matrix processing chip 220 may then be similarly partitioned and distributed across the matrix processing clusters 230 and/or high bandwidth memory (HBM) modules 240 of the particular matrix processing chip 220. For example, for certain matrix operations, partial matrix operations may be distributed to each matrix processing cluster 230. Alternatively, for certain matrix operations, partial matrix operations may be distributed across various "logical processing nodes" (e.g., groups of matrix processing clusters 230 associated with a high-bandwidth memory (HBM) module 240), and may then be distributed to each matrix processing cluster 230 of a particular logical processing node. In some embodiments, the matrix processing clusters 230 (and/or the logical processing nodes) may be cyclically configured similar to the matrix processing chips 220. The partition and partial matrix operations distributed to a particular matrix processing cluster 230 may then be similarly partitioned and distributed across the matrix processing units (MPUs) 234 of the particular matrix processing cluster 230.

Example Computer Processor Architectures

Figure 3:
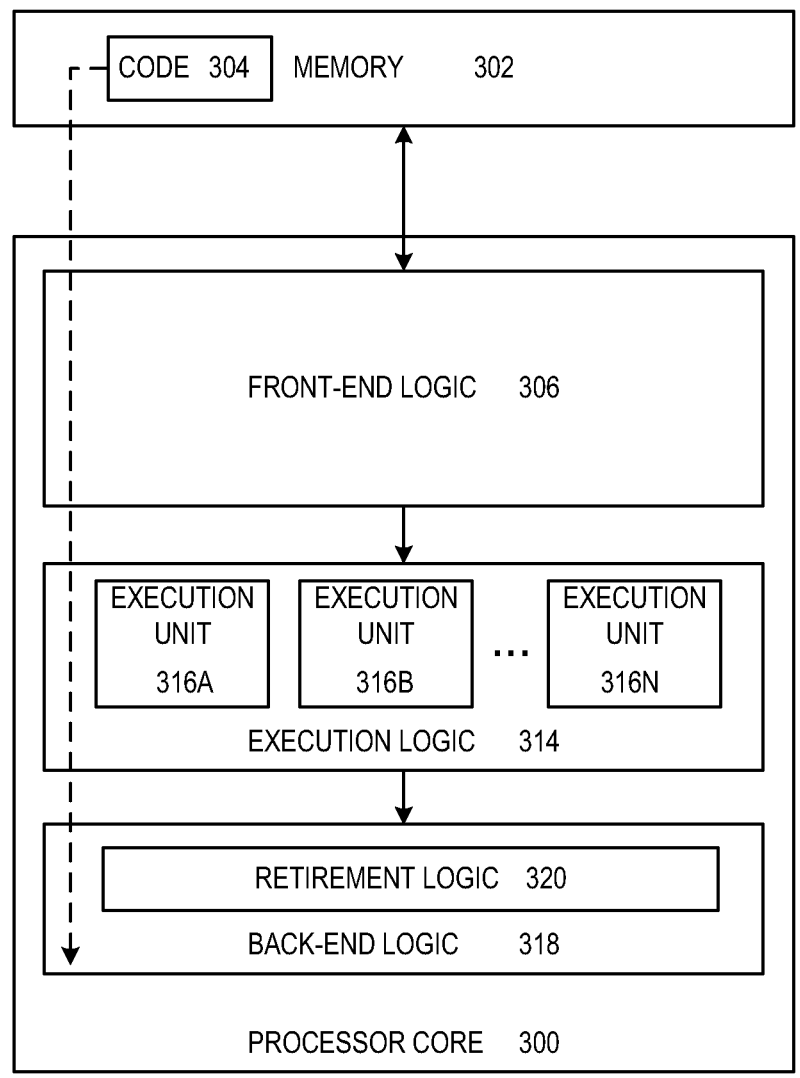
FIGS. 3 and 4 illustrate block diagrams for example embodiments of computer processors.
Figure 4:
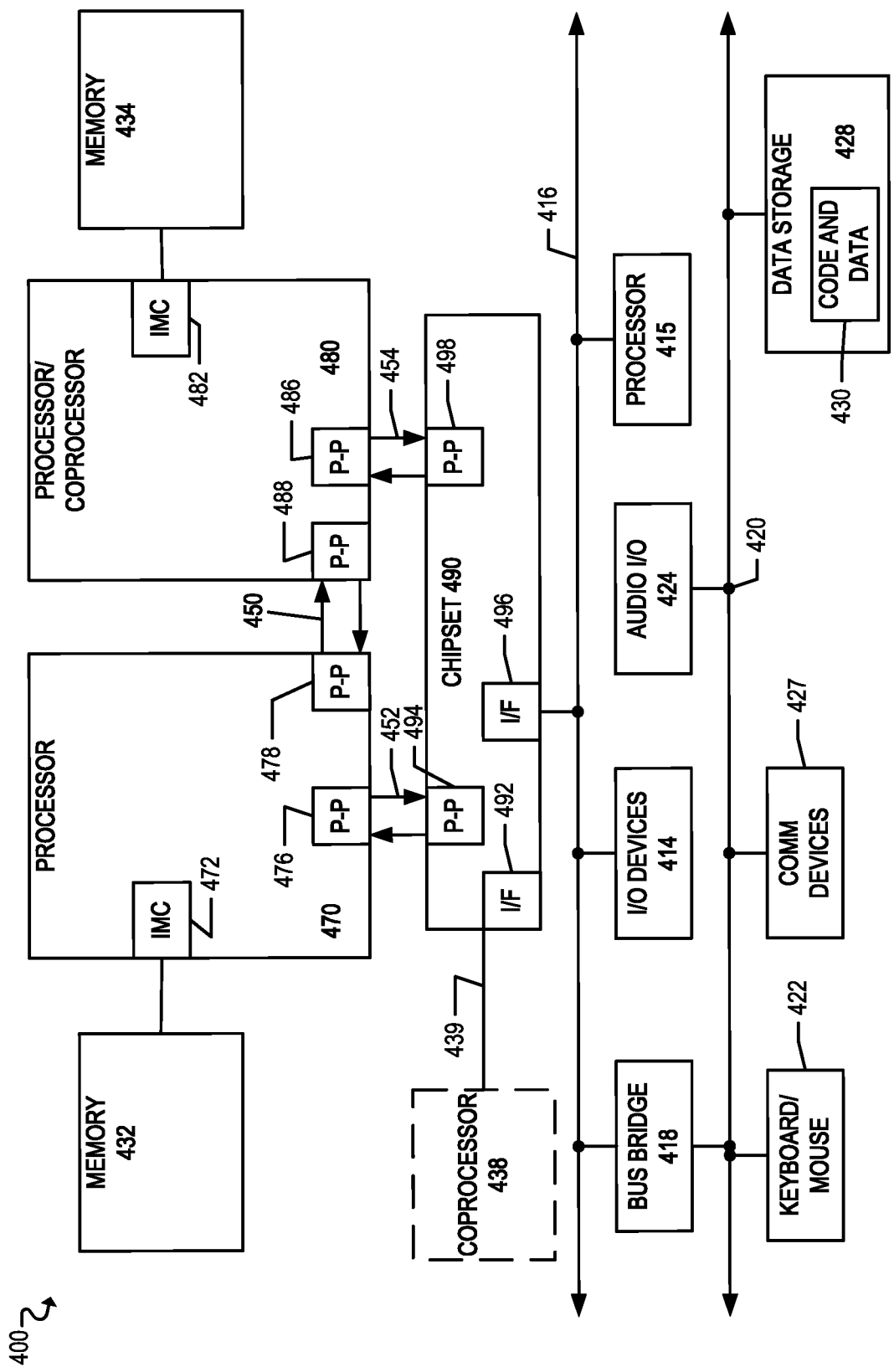

FIGS. 3 and 4 illustrate block diagrams for example embodiments of computer processors that may be used in accordance with embodiments disclosed herein. For example, the computer processors illustrated in FIGS. 3 and 4 may be used as host processors associated with matrix processing systems (e.g., host processor 260 in matrix processing system 200 of FIG. 2A), or as processors associated with other components and/or devices discussed throughout this disclosure (e.g., processors associated with components in system 100 of FIG. 1). Other processor and system designs and configurations known in the art for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 3 illustrates a block diagram for an example embodiment of a processor 300. Processor 300 is an example of a type of hardware device that can be used in connection with the embodiments described throughout this disclosure. Processor 300 may be any type of processor, such as a microprocessor, an embedded processor, a digital signal processor (DSP), a network processor, a multi-core processor, a single core processor, or other device to execute code. Although only one processor 300 is illustrated in FIG. 3, a processing element may alternatively include more than one of processor 300 illustrated in FIG. 3. Processor 300 may be a single-threaded core or, for at least one embodiment, the processor 300 may be multi-threaded in that it may include more than one hardware thread context (or "logical processor") per core.

FIG. 3 also illustrates a memory 302 coupled to processor 300 in accordance with an embodiment. Memory 302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 300 can execute any type of instructions associated with algorithms, processes, or operations detailed herein. Generally, processor 300 can transform an element or an article (e.g., data) from one state or thing to another state or thing.

Code 304, which may be one or more instructions to be executed by processor 300, may be stored in memory 302, or may be stored in software, hardware, firmware, or any suitable combination thereof, or in any other internal or external component, device, element, or object where appropriate and based on particular needs. In one example, processor 300 can follow a program sequence of instructions indicated by code 304. Each instruction enters a front-end logic 306 and is processed by one or more decoders 308. The decoder may generate, as its output, a micro operation such as a fixed width micro operation in a predefined format, or may generate other instructions, microinstructions, or control signals that reflect the original code instruction. Front-end logic 306 may also include register renaming logic and scheduling logic, which generally allocate resources and queue the operation corresponding to the instruction for execution.

Processor 300 can also include execution logic 314 having a set of execution units 316*a*, 316*b*, 316*n*, etc. Some embodiments may include a number of execution units dedicated to specific functions or sets of functions. Other embodiments may include only one execution unit or one execution unit that can perform a particular function. Execution logic 314 performs the operations specified by code instructions.

After completion of execution of the operations specified by the code instructions, back-end logic 318 can retire the instructions of code 304. In one embodiment, processor 300 allows out of order execution but requires in order retirement of instructions. Retirement logic 320 may take a variety of known forms (e.g., re-order buffers or the like). In this manner, processor 300 is transformed during execution of code 304, at least in terms of the output generated by the decoder, hardware registers and tables utilized by register renaming logic 310, and any registers (not shown) modified by execution logic 314.

Although not shown in FIG. 3, a processing element may include other elements on a chip with processor 300. For example, a processing element may include memory control logic along with processor 300. The processing element may include I/O control logic and/or may include I/O control logic integrated with memory control logic. The processing element may also include one or more caches. In some embodiments, non-volatile memory (such as flash memory or fuses) may also be included on the chip with processor 300.

FIG. 4 illustrates a block diagram for an example embodiment of a multiprocessor 400. As shown in FIG. 4, multiprocessor system 400 is a point-to-point interconnect system, and includes a first processor 470 and a second processor 480 coupled via a point-to-point interconnect 450. In some embodiments, each of processors 470 and 480 may be some version of processor 300 of FIG. 3.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of this disclosure is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

All or part of any component of FIG. 4 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Programmable Matrix Processing Engine

Figure 5:
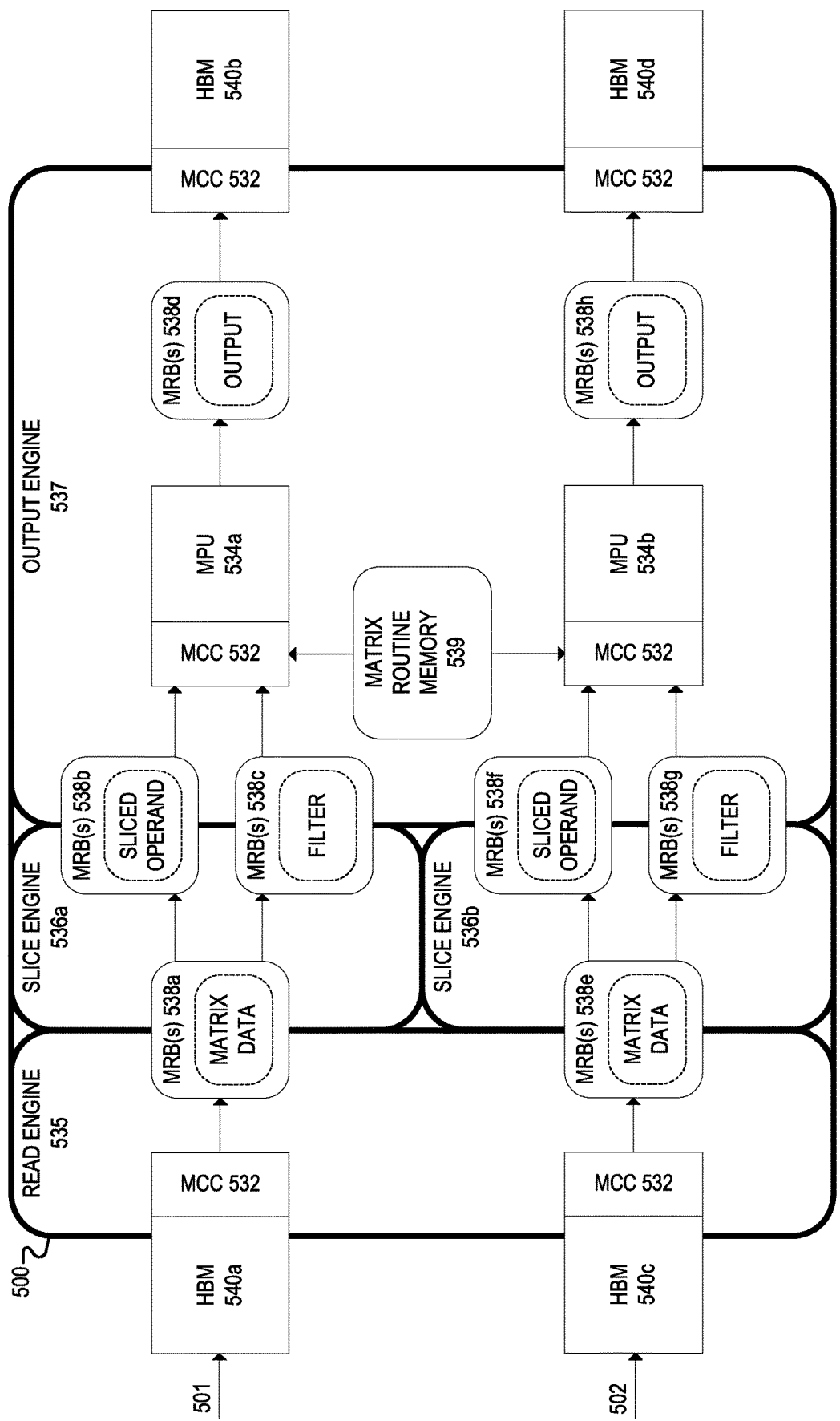
FIG. 5 illustrates an example embodiment of a programmable matrix processing engine.

FIG. 5 illustrates an example embodiment of a programmable matrix processing engine 500. In some embodiments, matrix processing engine 500 may be implemented by a matrix processing architecture, such as the matrix processing architecture of FIGS. 2A-2C. For example, in some embodiments, matrix processing engine 500 may be implemented by a matrix processing cluster on a matrix processing chip (e.g., matrix processing clusters 230 of matrix processing chip 220 from FIGS. 2B and 2C). In those embodiments, a particular matrix processing cluster may use its associated matrix processing engine 500 to perform matrix-based processing and operations, such as partial matrix operations associated with a particular matrix operation distributed across multiple matrix processing resources (e.g., as described throughout this disclosure).

In the illustrated embodiment, matrix processing engine 500 includes read engine 535, slice engines 536, and output engine 537, which are discussed further below. The illustrated embodiment also depicts various components of the underlying matrix processing architecture that may be involved when performing matrix operations using matrix processing engine 500. For example, the illustrated embodiment depicts high bandwidth memory (HBM) modules 540, master control CPU (MCC) 532, matrix processing units (MPUs) 534, memory resource blocks (MRBs) 538, and matrix routine memory 539. In the illustrated embodiment, for example, these various components are superimposed on matrix processing engine 500 to illustrate how and when they would be used by matrix processing engine 500, as described further below.

HBM modules 540 may be high bandwidth memory (HBM) modules designed to efficiently store and retrieve large volumes of matrix data. In some embodiments, for example, HBM modules 540 may be high bandwidth memory (HBM) modules on a matrix processing chip (e.g., HBM modules 240 of matrix processing chip 220 from FIG. 2B).

MCC 532 may be a master control CPU (MCC) used to control and/or manage matrix operations. In some embodiments, for example, MCC 532 may be the master control CPU on a particular matrix processing cluster (e.g., MCC 232 of matrix processing cluster 230 from FIG. 2C). In those embodiments, for example, MCC 532 may be used to control and/or manage matrix operations performed on its particular cluster.

MPUs 534 may be matrix processing units (MPUs) used to perform matrix operations. In some embodiments, for example, MPUs 534 may be matrix processing units on a particular matrix processing cluster (e.g., MPUs 234 of matrix processing cluster 230 from FIG. 2C). For example, in some embodiments, a matrix processing cluster may include multiple matrix processing units (MPUs) for performing matrix operations. The illustrated embodiment, for example, depicts two matrix processing units (MPUs) 534a and 534b. In some embodiments, MPUs 534 may perform matrix operations based on commands or instructions from master control CPU (MCC) 532.

Memory resource blocks (MRBs) 538 may be memory components designed to efficiently store and retrieve matrix data. In some embodiments, for example, MRBs 538 may be memory resource blocks on a particular matrix processing cluster (e.g., memory resource blocks 238 of matrix processing cluster 230 from FIG. 2C). In those embodiments, for example, MRBs 538 may be used to store and retrieve matrix data associated with matrix operations performed on the particular cluster.

Matrix routine memory 539 may be a memory component used to store matrix routines. A matrix routine, for example, may be a programmable routine for a matrix processor that is designed to perform a particular matrix operation when executed by the matrix processor. For example, a matrix routine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental operations. For example, in some embodiments, a matrix processor may support instructions for processing data, performing various arithmetic operations, and/or identifying matrix operands and outputs for the various instructions and operations.

For example, certain instructions may be used for processing data, such as reading, writing, and/or copying data (e.g., matrix data) to and from different locations, slicing matrix data, extracting matrix data, rearranging matrix data, and so forth.

As another example, certain instructions may be used to perform particular arithmetic operations, including any of the following operations: matrix multiplication; convolutions; unary matrix operations; binary matrix operations, such as addition (+), subtraction (−), multiplication (*), division (/), bitwise XOR, AND, OR, logical and arithmetic left and right shift, comparison (>, <, >=, <=, ==, !=); and column-wise, row-wise, and matrix-wide operations, such as sum, max value, and min value.

Moreover, special "register operand" (REGOP) instructions may be used to identify the matrix operands and outputs for the various supported instructions and operations. The register operand instructions, for example, may be used to specify the size and location of the operands and outputs of a particular instruction or operation. For example, in some embodiments, a register operand instruction may be used to identify a location in a high bandwidth memory (HBM) module or a memory resource block (MRB) that is associated with a particular operand or output. As an example, a basic matrix multiplication operation could be programmed using REGOP instructions to identify the location of each operand and the location of the output, followed by an instruction to perform a matrix multiplication operation.

In this manner, the fundamental instructions and/or commands supported by the matrix processor can be used to program matrix routines for more complex matrix operations, such as distributed matrix multiplication and/or convolution operations, dimension shuffle operations, reshape operations, and so forth.

Matrix routine memory 539 may be implemented in any portion of a matrix processing architecture, such as matrix processing chips, matrix processing clusters, and/or a host computing system. In some embodiments, for example, a matrix processing chip (e.g., matrix processing chip 220 of FIG. 2B) may include a matrix routine memory 539 that is accessible to the respective clusters on that matrix processing chip. As another example, in some embodiments, a matrix processing cluster (e.g., matrix processing cluster 230 of FIG. 2C) may include its own matrix routine memory 539. As yet another example, in some embodiments, a host computing system of a matrix processing architecture may include a matrix routine memory 539 accessible to its associated matrix processing resources (e.g., in FIG. 2A, host memory 270 of matrix processing system 200 may include a matrix routine memory accessible to matrix processing resources 210).

Moreover, matrix routine memory 539 may be any component or mechanism capable of storing data, including any type or combination of volatile and/or non-volatile memory, such as random access memory (RAM) (e.g., dynamic random access memory (DRAM), synchronous dynamic random access memory (SDRAM), static random access memory (SRAM)), flash-based memory, read only memory (ROM), logic blocks of a field programmable gate array (FPGA), erasable programmable read only memory (EPROM), electrically erasable programmable ROM (EEPROM), and/or any suitable combination of the foregoing.

As an example, in some embodiments, matrix routine memory 539 could be implemented using random access memory (e.g., SRAM) on a matrix processing chip. In these embodiments, for example, matrix routines could be loaded on matrix routine memory 539 by a host computing system (e.g., host processor 260 of FIG. 2A). For example, a host computing system could transfer the matrix routines to a matrix processing chip via an interconnect interface (e.g., a PCIe interface), and the matrix processing chip could then store the matrix routines on its associated matrix routine memory 539. In some embodiments, a software driver of the host computing system could be used to load the matrix routines. Moreover, in some embodiments, any existing matrix routines could be loaded on matrix routine memory 539 during system startup, while any additional matrix routines could be subsequently loaded after system startup, as appropriate.

In the illustrated example, matrix processing engine 500 performs multiple matrix operations 501 and 502 in parallel. For example, as noted above, in some embodiments matrix processing engine 500 may be implemented on a particular matrix processing cluster, and the particular matrix processing cluster may include multiple MPUs 534. In the illustrated example, matrix processing engine 500 is implemented on a cluster with two MPUs 534a-b. Accordingly, matrix processing engine 500 can perform two matrix operations 501 and 502 in parallel using the respective MPUs 534. The illustrated example shows the control flow of matrix processing engine 500 for both the $1^{st}$ matrix operation 501 and the $2^{nd}$ matrix operation 502.

In the illustrated example, the control flow for the $1^{st}$ matrix operation 501 begins with the read engine 535 of matrix processing engine 500. Read engine 535 may first retrieve matrix data (e.g., matrix data associated with the operands of matrix operation 501) from a corresponding HBM module 540a of a matrix processing chip, and read engine 535 may then store that matrix data in certain MRBs 538a of the particular cluster associated with read engine 535. For example, as noted above, HBM module 540a may be a high bandwidth memory module on a particular matrix processing chip (e.g., memory shared by the matrix processing clusters of the particular matrix processing chip), and MRBs 538 may be local memory resource blocks on a particular matrix processing cluster. Moreover, in some embodiments, read engine 535 may use the master control CPU (MCC) 532 on its respective cluster for storing and retrieving data on HBMs 540 and MRBs 538.

Slice engine 536a may then "slice" the matrix data stored in MRBs 538a to extract the particular matrix operands associated with matrix operation 501. For example, in some cases, the associated matrix operands may only include a subset of the matrix data stored in MRBs 538a, and/or the matrix operands may not be arranged contiguously in the matrix data stored in MRBs 538a. Accordingly, slice engine 536a may extract particular "slices" or pieces of the matrix data stored in MRBs 538a, and may then arrange the slices to form the respective matrix operands. For example, in the illustrated example, matrix operation 501 is associated with a convolution operation, and accordingly, slice engine 536a is used to extract a sliced matrix operand and filter from the matrix data stored in MRBs 538a. The sliced matrix operand and filter are then stored in MRBs 538b and 538c, respectively. In some cases, the particular slicing approach used by slice engine 536a may depend on various factors, including the type of matrix operation 501, the number of available processing resources, the size of the operands, and so forth. Moreover, in some embodiments, the particular slicing performed by slice engine 536a for a particular operation may be programmed and/or defined using a set of instructions supported by slice engine 536a.

Output engine 537 may then be used to compute a result for the particular matrix operation 501. For example, output engine 537 may perform the appropriate matrix operation 501 using the matrix operands generated by slice engine 536a (e.g., the matrix operands stored in MRBs 538b and 538c). For example, in some embodiments, output engine 537 may first identify an associated matrix routine corresponding to the particular matrix operation 501, and output engine 537 may then obtain that matrix routine from matrix routine memory 539. In some embodiments, output engine 537 may use the master control CPU (MCC) 532 on its respective cluster to retrieve matrix routines from matrix routine memory 539.

Output engine 537 may then specify or supply certain information or fields used by the matrix routine, if appropriate. For example, in some embodiments, certain information and/or fields of a matrix routine may be incomplete or unspecified, such as the size and/or location of the particular operands for the matrix routine. Accordingly, in some embodiments, output engine 537 may use MCC 532 to specify or supply any remaining information and/or fields for the particular matrix routine (e.g., the size and/or location of matrix operands).

Output engine 537 may then execute the particular matrix routine. For example, output engine 537 may use MCC 532 and/or MPU 534a to execute the programmed instructions associated with the particular matrix routine. MCC 532, for example, may be used to perform certain tasks specified by the instructions, such as reading and writing data, communicating with other resources, and so forth. MPU 534a, for example, may be used to perform particular arithmetic operations specified by the instructions. Moreover, in some cases, a particular matrix routine may be repeatedly executed or looped until the particular operation has been performed or completed for all requisite data (e.g., all data of a particular matrix operand).

Output engine 537 may then store the output or result of the matrix routine in certain MRB(s) 538d of the cluster used to execute the matrix routine. In some cases, output engine 537 may then provide the output stored in MRBs 538d to another component of the matrix processing architecture. For example, in some cases, a matrix operation 501 may be a partial matrix operation associated with a larger matrix operation distributed across multiple processing resources, and thus the output of matrix operation 501 may be a partial result associated with the larger distributed operation. Moreover, the output of partial matrix operation 501 may be needed by other processing resource(s) involved in the distributed matrix operation. Accordingly, output engine 537 may provide the output of partial matrix operation 501 to the appropriate resource, for example, for further processing and/or storage. In some cases, the appropriate resource may vary based on the circumstances, including the type of matrix operation being performed, the implementation of the associated matrix routine(s), the number and availability of processing resources, and so forth. For example, in some cases, the particular processing and/or destination of the output of a matrix operation may be programmed or defined by the associated matrix routine. Moreover, in some embodiments, output engine 537 may use the master control CPU (MCC) 532 on its respective cluster in order to provide the output of partial matrix operation 501 to the appropriate destination.

In some cases, for example, output engine 537 may provide the output of partial matrix operation 501 (e.g., the output stored in MRBs 538d) to a particular destination used to store the partial results of a distributed matrix operation. For example, for a distributed matrix operation, the respective partial results determined by each processing resource may be consolidated on a particular memory component, such as a particular HBM 540b of a matrix processing chip. For example, in some cases, the respective partial results determined by each cluster of a matrix processing chip may be consolidated on a particular HBM 540b of the matrix processing chip. Moreover, the partial results may be stored on an HBM 540b using a particular arrangement that collectively forms the complete result of the matrix operation.

As another example, in some cases output engine 537 may feed the output of partial matrix operation 501 (e.g., the output stored in MRBs 538d) back to MPU 534a, for example, to enable MPU 534a to use that output as an operand in a subsequent partial operation. In some cases, for example, the output of a partial operation in one stage of a distributed matrix operation may be used as an input or operand for a partial operation in another stage of the distributed matrix operation.

As another example, in some cases output engine 537 may provide the output of partial matrix operation 501 (e.g., the output stored in MRBs 538d) to another matrix processing resource, such as another matrix processing cluster on the same matrix processing chip, or another matrix processing chip altogether. For example, in some cases, a distributed matrix operation may be distributed across multiple clusters of a matrix processing chip, and/or across multiple matrix processing chips. Moreover, in some cases, the output of a partial operation performed by a particular matrix processing resource may be used as an operand in another partial operation performed by a different processing resource.

In the illustrated example, the $2^{nd}$ matrix operation 502 may be executed in parallel with the $1^{st}$ matrix operation 501. Moreover, the control flow for the $2^{nd}$ matrix operation 502 may be similar to the control flow described above for the $1^{st}$ matrix operation 501. The $2^{nd}$ matrix operation 502, however, may be a different matrix operation (e.g., performed using a different matrix routine), with different matrix operands and results, using different memory locations of HBMs 540 and/or MRBs 538, and executed using a different MPU 534b and associated slicing engine 536b.

Figure 6:
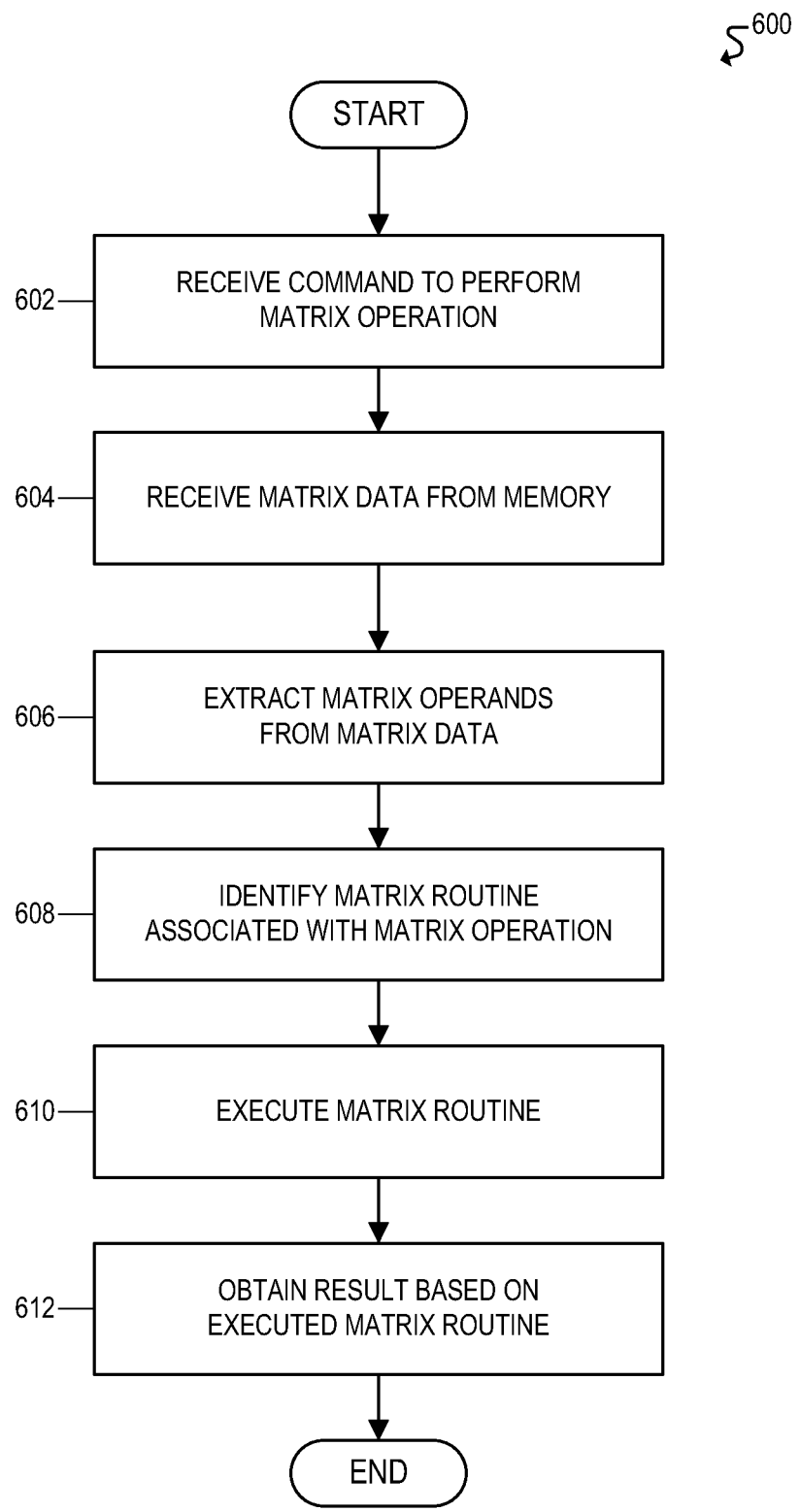
FIG. 6 illustrates a flowchart for an example embodiment of programmable matrix processing.

FIG. 6 illustrates a flowchart 600 for an example embodiment of programmable matrix processing. Flowchart 600 may be implemented, in some embodiments, by components described throughout this disclosure (e.g., the matrix processing architecture of FIGS. 2A-C and/or the programmable matrix processing engine of FIG. 5).

The flowchart may begin at block 602 by receiving a command to perform a matrix operation. The matrix operation may comprise an operation on one or more matrix operands. For example, the matrix operation could include any matrix-based arithmetic operation, including element-wise matrix operations, matrix multiplication, convolutions, and/or any combination of such operations.

Moreover, in some embodiments, matrix operations may be used to implement computer vision artificial intelligence and machine learning capabilities in an artificial neural network. For example, in some embodiments, the matrix operation of block 602 may be associated with operations in an artificial neural network, such as forward propagation, backward propagation, and/or weight update operations.

The flowchart may then proceed to block 604 to obtain matrix data from memory. The matrix data, for example, may be associated with one or more matrix operands of the matrix operation. In some embodiments, the matrix data may be obtained from multi-dimensional memory. Multi-dimensional memory, for example, may be a memory component designed to efficiently store and retrieve matrix data in multiple dimensions (e.g., two-dimensions). In some embodiments, the matrix data may be obtained by executing one or more instructions to obtain the matrix data from one or more memory locations of the multi-dimensional memory.

The flowchart may then proceed to block 606 to obtain matrix operands from the matrix data. In some embodiments, for example, the matrix operands may be obtained by slicing the matrix data to extract the matrix operands from the matrix data. Moreover, in some embodiments, the matrix operands may be obtained by executing one or more instructions to slice or extract the matrix operands from the matrix data.

The flowchart may then proceed to block 608 to identify a matrix routine associated with the matrix operation. A matrix routine, for example, may be a programmable routine for a matrix processor that is designed to perform a particular matrix operation when executed by the matrix processor. For example, a matrix routine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental matrix operations. For example, a matrix processor may include instructions and/or commands for identifying memory locations of matrix operands, obtaining matrix operands from memory, and/or performing particular arithmetic operations or computations on the matrix operands, among other examples. In this manner, the fundamental instructions and/or commands supported by the matrix processor can be used to program matrix routines for more complex matrix operations.

In some embodiments, a matrix routine memory may be used to store matrix routines, and the matrix routines may be retrieved from the matrix routine memory as needed. For example, in order to perform a desired matrix operation, a corresponding matrix routine may first be obtained from the matrix routine memory. In some cases, however, a particular matrix routine may not yet be stored on the matrix routine memory. Accordingly, the particular matrix routine may need to be loaded on the matrix routine memory. Thus, in some cases, a particular matrix routine may first be obtained from a host computing system, and may then be stored on the matrix routine memory.

The flowchart may then proceed to block 610 to execute the matrix routine. In some embodiments, for example, the matrix routine may be executed on a matrix processor using the one or more matrix operands. The flowchart may then proceed to block 612 to obtain a result of the matrix operation based on the matrix routine executed by the matrix processor. For example, in some cases, the particular matrix routine may return a result determined by the series of instructions and/or commands executed by the matrix processor.

At this point, the flowchart may be complete. In some embodiments, however, the flowchart may restart and/or certain blocks may be repeated. For example, in some embodiments, the flowchart may restart at block 602 to continue receiving and processing commands to perform matrix operations.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's° industry-leading x86 and x64 architectures), but also matrix processors, graphics processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLE IMPLEMENTATIONS

The following examples pertain to embodiments described throughout this disclosure.

One or more embodiments may include an apparatus, comprising: a multi-dimensional memory; a plurality of processing elements to perform a matrix operation on one or more matrix operands, wherein the plurality of processing elements comprises one or more matrix processors; wherein the plurality of processing elements is configured to: receive matrix data from the multi-dimensional memory, wherein the matrix data is associated with the one or more matrix operands; extract the one or more matrix operands from the matrix data; identify a matrix routine associated with the matrix operation; execute the matrix routine using the one or more matrix operands; and obtain a result of the matrix operation based on the executed matrix routine.

In one example embodiment of an apparatus, the apparatus further comprises a matrix routine memory, wherein the matrix routine memory comprises one or more matrix routines associated with one or more matrix operations.

In one example embodiment of an apparatus, the plurality of processing elements is further configured to receive the matrix routine from the matrix routine memory.

In one example embodiment of an apparatus, the plurality of processing elements is further configured to: receive the matrix routine from a host computing system; and store the matrix routine in the matrix routine memory.

In one example embodiment of an apparatus, the matrix routine comprises one or more instructions associated with the matrix operation.

In one example embodiment of an apparatus, the one or more instructions of the matrix routine comprise an indication of one or more memory locations associated with the one or more matrix operands.

In one example embodiment of an apparatus, the plurality of processing elements to extract the one or more matrix operands from the matrix data is further configured to slice the matrix data to extract the one or more matrix operands.

In one example embodiment of an apparatus, the plurality of processing elements is further configured to execute one or more instructions to extract the one or more matrix operands from the matrix data.

In one example embodiment of an apparatus, the plurality of processing elements is further configured to execute one or more instructions to obtain the matrix data from one or more memory locations of the multi-dimensional memory.

In one example embodiment of an apparatus, the matrix operation comprises one or more matrix multiplication operations.

In one example embodiment of an apparatus, the matrix operation comprises one or more convolution operations.

In one example embodiment of an apparatus, the matrix operation is associated with an operation in a neural network.

One or more embodiments may include a method, comprising: performing a matrix operation on one or more matrix operands, wherein performing the matrix operation comprises: receiving matrix data from a multi-dimensional memory, wherein the matrix data is associated with the one or more matrix operands; extracting the one or more matrix operands from the matrix data; identifying a matrix routine associated with the matrix operation; executing the matrix routine on a matrix processor using the one or more matrix operands; and obtaining a result of the matrix operation based on the matrix routine executed by the matrix processor.

In one example embodiment of a method, the method further comprises receiving the matrix routine from a matrix routine memory, wherein the matrix routine memory comprises one or more matrix routines associated with one or more matrix operations.

In one example embodiment of a method, the matrix routine comprises one or more instructions associated with the matrix operation.

In one example embodiment of a method, the one or more instructions of the matrix routine comprise an indication of one or more memory locations associated with the one or more matrix operands.

One or more embodiments may include a system, comprising: a plurality of memory elements, wherein the plurality of memory elements comprises a multi-dimensional memory; and a plurality of processing elements to perform a matrix operation on one or more matrix operands, wherein the plurality of processing elements comprises: a host processor; and one or more matrix processing chips; wherein the plurality of processing elements is configured to: receive matrix data from the multi-dimensional memory, wherein the matrix data is associated with the one or more matrix operands; extract the one or more matrix operands from the matrix data; identify a matrix routine associated with the matrix operation; execute the matrix routine using the one or more matrix operands; and obtain a result of the matrix operation based on the executed matrix routine.

In one example embodiment of a system, each matrix processing chip comprises a plurality of matrix processing clusters.

In one example embodiment of a system, each matrix processing cluster comprises a plurality of matrix processing units.

In one example embodiment of a system, each matrix processing cluster comprises a plurality of memory resource blocks.

One or more embodiments may include at least one machine accessible storage medium having instructions stored thereon, the instructions, when executed on a machine, cause the machine to: perform a matrix operation on one or more matrix operands, wherein the instructions that cause the machine to perform the matrix operation further cause the machine to: receive matrix data from a multi-dimensional memory, wherein the matrix data is associated with the one or more matrix operands; extract the one or more matrix operands from the matrix data; identify a matrix routine associated with the matrix operation; execute the matrix routine on a matrix processor using the one or more matrix operands; and obtain a result of the matrix operation based on the matrix routine executed by the matrix processor.

In one example embodiment of a storage medium, the instructions further cause the machine to receive the matrix routine from a matrix routine memory, wherein the matrix routine memory comprises one or more matrix routines associated with one or more matrix operations.

In one example embodiment of a storage medium, the matrix routine comprises one or more instructions associated with the matrix operation.

In one example embodiment of a storage medium, the matrix routine comprise an indication of one or more memory locations associated with the one or more matrix operands.

In one example embodiment of a storage medium, the instructions that cause the machine to receive the matrix data from the multi-dimensional memory further cause the machine to obtain the matrix data from one or more memory locations of the multi-dimensional memory.

One or more embodiments may include an apparatus comprising means to perform a method in any of the preceding examples.

One or more embodiments may include at least one machine accessible storage medium having instructions stored thereon, the instructions, when executed on a machine, cause the machine to: perform a method or realize an apparatus from any of the preceding examples.

What is claimed is:

1. A matrix processing circuit, comprising:
   a programmable matrix routine memory comprising circuitry to store a plurality of programmable matrix routines, wherein each of the plurality of programmable matrix routines comprises instructions for performing a corresponding matrix operation of a plurality of matrix operations, and wherein the programmable matrix routine memory is to be programmed with the plurality of programmable matrix routines that are to be executed to perform the plurality of matrix operations;
   one or more matrix processing units comprising circuitry to perform matrix computations; and
   a controller comprising circuitry to:
      receive a command to perform a particular matrix operation of the plurality of matrix operations;
      identify a programmable matrix routine corresponding to the particular matrix operation, wherein the programmable matrix routine is identified from the plurality of programmable matrix routines;
receive the programmable matrix routine from the programmable matrix routine memory;
execute the programmable matrix routine, wherein one or more matrix computations associated with execution of the programmable matrix routine are performed using the one or more matrix processing units; and
determine a result of the particular matrix operation, wherein the result is determined based on execution of the programmable matrix routine.

2. The matrix processing circuit of claim 1, wherein the circuitry to execute the programmable matrix routine is to:
receive one or more matrix operands associated with the particular matrix operation; and
perform, using the one or more matrix processing units, the one or more matrix computations on the one or more matrix operands.

3. The matrix processing circuit of claim 2, wherein:
the matrix processing circuit further comprises a plurality of memory resource blocks; and
the circuitry to receive the one or more matrix operands associated with the particular matrix operation is further to:
receive matrix data from a memory, wherein the matrix data is associated with the one or more matrix operands;
extract the one or more matrix operands from the matrix data; and
store the one or more matrix operands in one or more of the plurality of memory resource blocks.

4. The matrix processing circuit of claim 3, wherein:
the programmable matrix routine comprises a set of instructions for performing the particular matrix operation; and
the set of instructions comprises:
a first subset of instructions to receive the matrix data from the memory and extract the one or more matrix operands from the matrix data; and
a second subset of instructions to perform the one or more matrix computations on the one or more matrix operands.

5. The matrix processing circuit of claim 3, wherein:
the one or more matrix processing units comprise a plurality of matrix processing units; and
the matrix processing circuit further comprises a matrix processing cluster, wherein the matrix processing cluster comprises the plurality of matrix processing units and the plurality of memory resource blocks.

6. The matrix processing circuit of claim 1, wherein the controller further comprises circuitry to:
receive the plurality of programmable matrix routines from a host computing system; and
store the plurality of programmable matrix routines in the programmable matrix routine memory.

7. The matrix processing circuit of claim 1, wherein the one or more matrix computations comprise one or more matrix multiplication computations.

8. The matrix processing circuit of claim 1, wherein the one or more matrix computations comprise one or more convolution computations.

9. The matrix processing circuit of claim 1, wherein the particular matrix operation is associated with an operation for an artificial neural network.

10. A system, comprising:
a processor to execute an application, wherein execution of the application comprises a plurality of matrix operations; and
matrix processing circuitry to perform the plurality of matrix operations, wherein the matrix processing circuitry comprises:
a programmable matrix routine memory comprising circuitry to store a plurality of programmable matrix routines, wherein each of the plurality of programmable matrix routines comprises instructions for performing a corresponding matrix operation of the plurality of matrix operations, and wherein the programmable matrix routine memory is to be programmed with the plurality of programmable matrix routines that are to be executed to perform the plurality of matrix operations;
one or more matrix processing clusters, wherein each of the one or more matrix processing clusters comprises a plurality of matrix processing units, wherein the plurality of matrix processing units comprise circuitry to perform matrix computations; and
a controller comprising circuitry to:
receive a command to perform a particular matrix operation of the plurality of matrix operations;
identify a programmable matrix routine corresponding to the particular matrix operation, wherein the programmable matrix routine is identified from the plurality of programmable matrix routines;
receive the programmable matrix routine from the programmable matrix routine memory;
distribute execution of the programmable matrix routine across the one or more matrix processing clusters; and
determine a result of the particular matrix operation, wherein the result is determined based on execution of the programmable matrix routine.

11. The system of claim 10, wherein the one or more matrix processing clusters comprise:
a plurality of matrix processing clusters; and
a multi-dimensional mesh interconnect to communicatively couple the plurality of matrix processing clusters.

12. The system of claim 10, wherein each of the one or more matrix processing clusters further comprises circuitry to:
receive one or more matrix operands associated with the particular matrix operation; and
perform, using the plurality of matrix processing units, a plurality of matrix computations on the one or more matrix operands.

13. The system of claim 12, wherein:
the matrix processing circuitry further comprises one or more memory modules;
each of the one or more matrix processing clusters further comprises a plurality of memory resource blocks; and
the circuitry to receive the one or more matrix operands associated with the particular matrix operation is further to:
receive matrix data from the one or more memory modules, wherein the matrix data is associated with the one or more matrix operands;
extract the one or more matrix operands from the matrix data; and
store the one or more matrix operands in one or more of the plurality of memory resource blocks.

14. The system of claim 13, wherein:
the programmable matrix routine comprises a set of instructions for performing the particular matrix operation; and
the set of instructions comprises:
a first subset of instructions to receive the matrix data from the one or more memory modules and extract the one or more matrix operands from the matrix data; and
a second subset of instructions to perform the plurality of matrix computations on the one or more matrix operands.

15. The system of claim 10, wherein the controller further comprises circuitry to:
receive the plurality of programmable matrix routines from the processor; and
store the plurality of programmable matrix routines in the programmable matrix routine memory.

16. At least one non-transitory machine accessible storage medium having instructions stored thereon, the instructions, when executed on a machine, cause the machine to:
receive a command to perform a particular matrix operation of a plurality of matrix operations;
identify a programmable matrix routine corresponding to the particular matrix operation, wherein the programmable matrix routine is identified from a plurality of programmable matrix routines, wherein each of the plurality of programmable matrix routines comprises programmable instructions for performing a corresponding matrix operation of the plurality of matrix operations;
receive the programmable matrix routine from a programmable matrix routine memory, wherein the programmable matrix routine memory is programmed with the plurality of programmable matrix routines that are to be executed to perform the plurality of matrix operations;
execute the programmable matrix routine, wherein one or more matrix computations associated with execution of the programmable matrix routine are performed using one or more matrix processing units, wherein the one or more matrix processing units comprise circuitry to perform matrix computations; and
determine a result of the particular matrix operation, wherein the result is determined based on execution of the programmable matrix routine.

17. The storage medium of claim 16, wherein the instructions that cause the machine to execute the programmable matrix routine further cause the machine to:
receive one or more matrix operands associated with the particular matrix operation; and
perform, using the one or more matrix processing units, the one or more matrix computations on the one or more matrix operands.

18. The storage medium of claim 17, wherein the instructions that cause the machine to receive the one or more matrix operands associated with the particular matrix operation further cause the machine to:
receive matrix data from a memory, wherein the matrix data is associated with the one or more matrix operands;
extract the one or more matrix operands from the matrix data; and
store the one or more matrix operands in one or more of a plurality of memory resource blocks.

19. The storage medium of claim 18, wherein:
the programmable matrix routine comprises a set of instructions for performing the particular matrix operation; and
the set of instructions comprises:
a first subset of instructions to receive the matrix data from the memory and extract the one or more matrix operands from the matrix data; and
a second subset of instructions to perform the one or more matrix computations on the one or more matrix operands.

20. The storage medium of claim 16, wherein the instructions further cause the machine to:
receive the plurality of programmable matrix routines from a host computing system; and
store the plurality of programmable matrix routines in the programmable matrix routine memory.

21. A method, comprising:
receiving a command to perform a particular matrix operation of a plurality of matrix operations;
identifying a programmable matrix routine corresponding to the particular matrix operation, wherein the programmable matrix routine is identified from a plurality of programmable matrix routines, wherein each of the plurality of programmable matrix routines comprises programmable instructions for performing a corresponding matrix operation of the plurality of matrix operations;
receiving the programmable matrix routine from a programmable matrix routine memory, wherein the programmable matrix routine memory is programmed with the plurality of programmable matrix routines that are to be executed to perform the plurality of matrix operations;
executing the programmable matrix routine, wherein one or more matrix computations associated with execution of the programmable matrix routine are performed using one or more matrix processing units, wherein the one or more matrix processing units comprise circuitry to perform matrix computations; and
determining a result of the particular matrix operation, wherein the result is determined based on execution of the programmable matrix routine.

22. The method of claim 21, wherein executing the programmable matrix routine comprises:
receiving one or more matrix operands associated with the particular matrix operation; and
performing, using the one or more matrix processing units, the one or more matrix computations on the one or more matrix operands.

23. The method of claim 22, wherein receiving the one or more matrix operands associated with the particular matrix operation comprises:
receiving matrix data from a memory, wherein the matrix data is associated with the one or more matrix operands;
extracting the one or more matrix operands from the matrix data; and
storing the one or more matrix operands in one or more of a plurality of memory resource blocks.

24. The method of claim 23, wherein:
the programmable matrix routine comprises a set of instructions for performing the particular matrix operation; and
the set of instructions comprises:
a first subset of instructions to receive the matrix data from the memory and extract the one or more matrix operands from the matrix data; and a second subset of instructions to perform the one or more matrix computations on the one or more matrix operands.

25. The method of claim 21, further comprising:

receiving the plurality of programmable matrix routines from a host computing system; and storing the plurality of programmable matrix routines in the programmable matrix routine memory.

\* \* \* \* \*